: 3,595,717
EPOXY CURED HYDROCARBON POLYMER PROPELLANT COMPOSITION AND METHOD OF MAKING THE SAME

Robert Dean Lowrey, Hopkins, Minn., and William Edward Hunter, Huntsville, Ala., assignors to Thiokol Chemical Corporation, Trenton, N.J.
No Drawing. Original application Jan. 6, 1958, Ser. No. 707,444. Divided and this application June 20, 1961, Ser. No. 130,441
Int. Cl. C06d 5/06
U.S. Cl. 149—19       10 Claims This application is a division of application Ser. No. 707,444 filed Jan. 6 1958.

This invention relates to combustible compositions that contain the oxygen required for their combustion, and more particularly to a novel solid composition of this type that comprises a predominantly hydrocarbon fuel and an oxidizing agent therefor, as well as to a method of making such compositions. Compositions of this type have been used to produce the necessary high temperature gases required for the propulsion of rockets, aircraft boosters, missiles and the like, and for convenience will be referred to herein as propellants, although as the description proceeds it will become apparent that the compositions can also be employed for certain non-propulsive uses e.g. gas or smoke generators.

It has been recognized for many years that hydrocarbons because of their relatively high heat of combustion per unit weight are desirable fuels for rocket propulsion. The hydrocarbons have been used with a degree of success as liquid fuels. However, liquid fuels require more or less elaborate pumping systems to pump them to the point where they are to be burned and mixing devices for mixing them with a material containing the oxygen for their combustion.

The need for pumps and mixing devices can be circumvented by employing a solid propellant, but difficulties have been encountered in formulating a solid propellant capable of satisfying the numerous practical requirements that must be met. Thus the propellant should desirably be castable i.e. readily convertible by curing or otherwise from a liquid to a solid state in situ in a container. More particularly the propellant should be capable of existing in a sufficiently fluid state to permit it to be poured or extruded into a metal container having an intricate internal configuration without limitation as to size or shape, and converted in situ therein into a solid mass. Moreover, the conversion from the liquid to the solid state in situ in the metal container should occur without evolution of gas or significant dimensional changes in the mass, so that a charge of uniform and reproducible density will be obtained.

The propellant charge must be capable of burning completely at a predictable rate. If the combustion is irregular or incomplete due to nonhomogeneity of the propellant, erratic performance of the rocket motor, or other device in which the propellant is used will result. If the propellant is of a brittle or friable character, it may disintegrate to some extent due to physical or thermal shocks to which it may be subjected, thereby producing cracks or fissures that greatly increase the exposed surface area. Since the combustion normally occurs at exposed surfaces of the propellant, the formation of such cracks greatly increases the rate of gas evolution and in some cases may produce a pressure increase sufficient to rupture the motor casing. Cracks in the propellant may also cause premature burn-through of the propellant web, and thereby permit local overheating of the case and consequent rupture. It is further necessary that the propellant charge remain in satisfactory firing condition when it is subjected to relatively low atomspheric temperatures. Preferably the charge should retain its elasticity and resistance to shock at temperatures as low as —70° F.

Though many plastic materials are liquids which can be mixed and handled easily and thereafter converted to a solid form, their chief deficiency for use as a fuel-binder in this type of propellant arises from the fact that after curing nearly all of the readily available plastics lack flexibility and resilience, and thereby give poor performance at low temperatures (below 32° F.). A notable exception, plasticized polyvinyl chloride, though flexible, is less desirable than an essentially hydrocarbon polymer because of its high percentage of chlorine. The most successful propellants of this general type have employed a mixture of oxidizing agent and liquid polysulfide polymer which is cured in situ in a metal casing to provide a propellant grain or charge that remains shock resistant at relatively low temperatures. While this type of propellant more nearly meets the many requirements mentioned above than any other previously proposed composition, it is still subject to a number of disadvantages. Thus the presence of the sulfur reduces the specific impulse of the composition, i.e. the total useful energy developed per unit weight of material.

It is accordingly an object of the present invention to provide a solid combustible composition that has improved properties when used as a missile propellant. It is another object of the invention to provide an improved binder and fuel for such a propellant composition. It is still another object of the invention to provide solid propellant compostion that is made from relatively inexpensive raw materials and has acceptable low temperature properties. It is a still further object of the invention to provide an organic binder and fuel for such a propellant that burns without leaving a solid residue and can be cured with a curing agent that burns without leaving a solid residue. It is still another object of the invention to provide a binder and fuel material of this type that can be cured by a curing agent without evolution of gas and without substantial dimensional changes in the mass. It is still another object of the invention to introduce functional groups into essentially hydrocarbon polymers intended for formulation into castable propellants to render them susceptible to curing to a solid combustible composition that has properties useful as a propellant. Other objects of the invention will be in part obvious and in part pointed out hereafter.

The objects of the invention can be achieved in general by utilizing as the binder-fuel of a solid propellant composition an epoxide-cured acrylo-butadiene copolymer. In carrying out a preferred embodiment of the invention an acrylo-butadiene copolymer having carboxyl groups is first prepared. Such a polymer may be prepared in various ways. For example, butadiene or a substituted butadiene, e.g. a lower alkyl substituted butadiene such as isoprene or dimethylbutadiene may be copolymerized with acrylic acid or a substituted acrylic acid such as methacrylic acid to yield a polymer containing a carboxyl group or groups. Alternatively the substituted or unsubstituted butadiene can be copolymerized with an ester of acrylic acid or of a substituted acrylic acid, e.g. a lower alkyl acrylate, and the resulting copolymer hydrolyzed to eliminate the alkyl groups. Such copolymers are referred to herein as acrylo-butadiene copolymers, and details concerning their preparation are given in the specific examples below.

The liquid copolymer as thus prepared is mixed with a liquid polyepoxide curing agent and a suitable oxidizing agent. Inorganic non-metallic oxidizing agents such as ammonium perchlorate and ammonium nitrate are preferred. The oxidizing agent ordinarily comprises from 3 to 7 parts per part by weight of the binder-fuel. The polyepoxide may be any of the known liquid polyepoxide compositions. It may be used in the proportions of 0.1 to 0.33 part by weight per part of copolymer.

If the propellant mixture as thus prepared is to be used in making a rocket motor, it is then introduced into the interior of a motor casing. An illustrative propellant loading procedure is given in the examples. The propellant mixture is cured in situ in the casing by heating to an elevated temperature for a period of time, e.g. 170° F. for 24 hours, during which period the propellant mixture is converted to a solid mass. Solid propellant motors as thus made have excellent shock resistant characteristics and retain such characteristics at relatively low temperatures.

In order to point out more fully the nature of the present invention, the following specific examples are given of methods of making the copolymers and propellant compositions of the present invention:

EXAMPLE 1

A mixture of butadiene and methyl acrylate are copolymerized in aqueous emulsion in the following manner. A polymerization reaction vessel provided with an agitator and capable of being sealed is charged with 43.2 parts by weight of 1,3 butadiene, 7.64 parts of methyl acrylate, 100 parts of water that has previously been freed from air by boiling or distillation, 1 part of dioctyl sodium sulfosuccinate emulsifying agent, 8 parts of dodecyl mercaptan as a modifier, and 0.18 part of potassium persulfate as an initiator. The reaction vessel is sealed shut and the mixture therein agitated at a suitable temperature within the range of 40–60° C., e.g. 47° C., for a number of hours. The progress of the reaction is followed by periodically removing samples and analyzing for total solids with a correction being made for the emulsifier. When the total solids in an aliquot reaches 70% by weight of the total weight of monomers charged, the reaction is considered complete. This point is sometimes called 70% conversion and may be reached in 15 to 52 hours depending on the batch size, composition and various other factors.

When samples taken show 70% conversion, the emulsion is run into approximately 25 parts by weight of a solution of potassium aluminum sulfate containing 10% by weight of the alum calculated with the water of hydration included. The resulting mixture is warmed to remove unreacted butadiene which can be recovered and re-used. The copolymer creams to the top and is separated from the aqueous layer which is discarded.

The acrylo-butadiene copolymer is then hydrolyzed with 15% by weight aqueous sodium hydroxide. The amount of sodium hydroxide solution used is 100% in excess of that required on the basis of stoichiometrical calculations. The mixture of polymer and caustic soda is stirred and heated at 80°–100° C. until hydrolysis is complete, the time required being usually about 6 hours or more. The progress of the hydrolysis reaction may be followed by taking samples from time to time; neutralizing, washing and drying the samples; and determining their infra-red absorption characteristics. Hydrolysis is considered complete when the infra-red absorption shifts from 1735 cm.$^{-1}$ to 1700 cm.$^{-1}$, i.e. from the characteristic absorption of an ester to the characteristic absorption of a carboxyl group.

The hydrolysis reaction converts the product to a butadiene-acrylic acid copolymer. When hydrolysis is complete, spent alkali is separated and dilute hydrochloric acid is added to the polymer until it is neutral to litmus paper. The polymer is then separated, thinned with dioxane, and separated by dilution with water. The polymer is washed until it is neutral, separated from the wash water, and dried under vacuum in a steam-heated falling-film evaporator of conventional design. Complete removal of water is evidenced by the fact that the polymer is clear and no longer cloudy.

The polymer as thus made is incorporated in a propellant mix. Thus 13.06 parts by weight of the liquid polymer are mixed with 2.77 parts by weight of a commercial liquid polyepoxide curing agent sold under the trade designation BR 18795. This product is understood to be an epoxide curing agent made from bisphenol A and epichlorhydrin and having the structure $$Me_2C(C_6H_4OCH_2CH\text{---}CH_2O\text{ para})_2$$

or a low multiple thereof. The commercial product is believed to be largely monomer with minor amounts of dimer and trimer.

The liquid polymer and the epoxide are introduced into a sigma blade Baker-Perkins mixer and mixed at low speed, e.g. 33 r.p.m. Thereafter 84.17 parts of ammonium perchlorate are added. The ammonium perchlorate preferably comprises a mixture of two grain sizes, say 75% by weight having a particle size such that grains will be retained by a 140 mesh screen and 25% having a particle size of about 5 to 80 microns. The time required for mixing varies with the size of the batch; for a 4000 gram batch, 45 minutes is required.

The propellant mixture as thus prepared is introduced into a rocket motor and cured to a solid mass in situ therein by being heated in a curing oven for a suitable period, e.g. 24 hours at 170° F. The propellant is usually cast around a central mandrel which is later withdrawn to provide an open space having any of various cross-sectional configurations and extending through the propellant charge. A suitable electrically-actuatable igniter is introduced into the motor casing for ignition of the charge.

It has been found that propellants of the type described above have a burning rate of 0.336 in./sec. at 1000 p.s.i. and a specific impulse of 240 lb.-sec./lb.

EXAMPLE 2

Acrylo-butadiene copolymers of the type referred to herein can also be made by reaction between butadiene and acrylic acid as illustrated in the present example. A polymerization reaction vessel is charged with 87.1 parts by weight of butadiene, 12.9 parts of acrylic acid, 180 parts of water which has been previously boiled or distilled to remove air, 17.92 parts of 25% aqueous solution of benzylcetyldimethylammonium chloride as an emulsifying agent, 14.93 grams of dodecyl mercaptan as a modifier, and 0.265 to 0.35 parts of 2,2'-azo-bis-isobutyronitrile as an initiator. The butadiene and acrylic acid are freed from stabilizers before being charged to the reaction vessel.

After charging, the reaction vessel is sealed and the mixture therein is agitated at a suitable temperature within the range of 40–60° C., e.g. 47° C., until the conversion (as defined in Example 1) reaches 70–76%. The batch is then run into 25 parts of 15% by weight aqueous sodium chloride and warmed to expel unreacted butadiene, which may be recovered if desired. The polymer creams to the top and is washed until a sample of the filtered washings no longer gives a test for chloride ion with silver nitrate solution. The product is then de-watered in an evaporator as described in Example 1.

The product as thus prepared can be mixed with a polyepoxide and oxidizing agent as described in Example 1 to provide a readily curable propellant mixture.

EXAMPLE 3

A polymerization reaction vessel is charged with 92.3 parts by weight of butadiene, 7.7 parts of methacrylic acid, 17.2 parts of a 25% aqueous solution of benzylcetyldimethylammonium chloride as an emulsifying agent, 180 parts of water which has been previously boiled or distilled to remove air, 14.34 parts of n-dodecyl mercaptan as a modifier, and 0.2 parts of 2,2'-azobis-isobutyronitrile as an initiator.

After charging, the reaction vessel is sealed and the mixture therein is agitated at a suitable temperature within the range of 40–60° C., e.g. 47° C. until the conversion (as defined in Example 1) reaches 50% to 70%.

The batch is then run into 25 parts of 10% by weight aqueous sodium chloride and warmed to expel unreacted butadiene, which may be recovered if desired. The liquid polymer creams to the top and is washed with water until a sample of the filtered washing no longer gives a test for chloride ion with silver nitrate solution. The polymer is then de-watered in an evaporator as described in Example 1.

The polymer as thus prepared can be incorporated in a propellant as described in Example 1.

EXAMPLE 4

A polymerization reaction vessel is charged with 89.5 parts by weight of isoprene, 10.5 parts of acrylic acid, 180 parts of water which has been previously boiled or distilled to remove air, 17.2 parts of a 25% aqueous solution of benzylcetyldimethylammonium chloride as an emulsifying agent, 14.34 parts of n-dodecyl mercaptan as a modifier, and 0.3 part of 2,2'-azo-bis-isobutyronitrile as an initiator.

After charging, the reaction vessel is sealed and the mixture therein is agitated at a suitable temperature within the range of 40–60° C., e.g. 47° C., until the conversion (as defined in Example 1) reaches 50% to 70%. The batch is then run into 25 parts of 10% by weight aqueous sodium chloride and warmed to expel unreacted isoprene, which may be recovered if desired. The liquid polymer creams to the top and is washed with water until a sample of the filtered washing no longer gives a test for chloride ion with silver nitrate solution. The polymer is then de-watered in an evaporator as described in Example 1.

The polymer as thus prepared can be incorporated in a propellant as described in Example 1.

EXAMPLE 5

The procedure of Example 1 is followed except that 14.85 parts by weight of the liquid polymer, 3.15 parts of the liquid polyepoxide curing agent, and 74.0 part of ammonium perchlorate are used. Also 8.0 parts by weight of 3 to 8 micron aluminum powder is added to the mixer after introduction of the liquid polymer and epoxide thereinto and before addition of the ammonium perchlorate.

It has been found that when this propellant mix is introduced into a rocket motor and cured as in Example 1, the propellant has a burning rate of 0.310 in./sec. at 1000 p.s.i. and a specific impulse of 240 lb.-sec./lb. at optimum nozzle expansion at sea-level pressure.

It will, of course, be understood that the foregoing examples are illustrative only and that numerous changes can be made in the materials, proportions, and conditions described without departing from the spirit of the invention as set forth in the appended claims.

We claim:

1. A solid combustible composition adapted to be used as a missile propellant comprising a dispersion of a finely divided solid, non-metallic, inorganic oxidizing agent in a rubber-like matrix having a high fuel value, said matrix being essentially an epoxide-cured acrylobutadiene copolymer.

2. A solid combustible composition adapted to be used as a missile propellant comprising a dispersion of a finely divided solid, non-metallic, inorganic oxidizing agent in a rubber-like matrix, said matrix being essentially a solid reaction product of a liquid polyepoxide and a liquid copolymer of an acrylic acid and a butadiene.

3. A solid combustible composition adapted to be used as a missile propellant comprising a dispersion of a finely divided solid, non-metallic inorganic oxidizing agent in a rubber-like matrix, said matrix being essentially a solid reaction product of a liquid polyepoxide and a liquid copolymer of an acrylic acid and isoprene.

4. The method of making a solid combustible composition adapted to be used as a missile propellant which comprises copolymerizing a diene selected from the group consisting of butadiene and substituted butadienes with an acrylic compound selected from the group consisting of acrylic acid, substituted acrylic acids and their esters to form a liquid copolymer having carboxyl groups, mixing said copolymer with a liquid polyepoxide, dispersing a finely divided solid, non-metallic, inorganic oxidizing agent in the mixture, and heating the mixture to cause said epoxide to react with said polymer to form a rubber-like solid.

5. A method according to claim 4 and wherein said acrylic compound is methyl acrylate.

6. A method according to claim 4 and wherein said acrylic compound is acrylic acid.

7. A method according to claim 4 and wherein said acrylic compound is methacrylic acid.

8. A method according to claim 4 and wherein said diene is butadiene.

9. A method according to claim 4 and wherein said diene is isoprene.

10. A solid combustible composition adapted to be used as a missile propellant comprising a dispersion of a finely divided solid, non-metallic inorganic oxidizing agent in a rubber-like matrix having a high fuel value, said matrix being a cured essentially hydrocarbon polymer cured with a curing agent comprising a liquid polyepoxide.

References Cited

UNITED STATES PATENTS

| | | | |
|---|---|---|---|
| 3,031,288 | 4/1962 | Roberts | 149—83X |
| 3,028,271 | 4/1962 | Dixon et al. | 149—19 |
| 2,855,372 | 10/1958 | Jenkins et al. | 149—20X |
| 2,997,376 | 8/1961 | Bartley | 149—19 |
| 3,012,866 | 12/1961 | Zucrow et al. | 149—76X |
| 3,148,229 | 9/1964 | Borden Kircher | 264—3 |

BENJAMIN R. PADGETT, Primary Examiner

U.S. Cl. X.R.

149—20